United States Patent [19]
Holzinger et al.

[11] B 3,990,553

[45] Nov. 9, 1976

[54] TRANSMISSION CONTROL SYSTEM WITH IMPROVED MODULATING VALVE

[75] Inventors: Charles E. Holzinger, Peoria; William W. Blake, Kewanee, both of Ill.

[73] Assignee: Caterpillar Tractor Co., Peoria, Ill.

[22] Filed: Feb. 10, 1975

[21] Appl. No.: 548,719

[44] Published under the second Trial Voluntary Protest Program on February 17, 1976 as document No. B 548,719.

[52] U.S. Cl. .............................. 192/3.57; 192/109 F
[51] Int. Cl.² ........................................ B60K 21/00
[58] Field of Search ............ 192/109 F, 3.57, 87.13, 192/87.19

[56] References Cited
UNITED STATES PATENTS

| | | |
|---|---|---|
| 3,137,311 | 6/1964 | Rohweder et al. ............... 192/109 F |
| 3,468,194 | 9/1969 | Horsch et al. ..................... 192/109 F |
| 3,882,980 | 5/1975 | Blake ................................ 192/3.57 |

*Primary Examiner*—Benjamin W. Wyche
*Attorney, Agent, or Firm*—Phillips, Moore, Weissenerger, Lempio & Strabala

[57] ABSTRACT

A hydraulic transmission control circuit includes a hydraulically responsive modulating valve for modulating a first fluid pressure and a differential valve for establishing a second fluid pressure communicated to a master clutch, the control circuit also including a manually controlled modulating valve for precisely adjusting the second pressure and for selectively adjusting the first fluid pressure during regulation of the second fluid pressure, the manual modulating valve also being adapted for selectively communicating the hydraulically responsive modulating valve with a drain in order to assure a proper rate of modulation for both the first and second fluid pressures.

6 Claims, 8 Drawing Figures

FIG_1

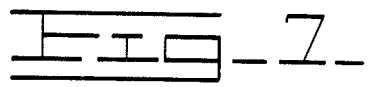
Fig. 7
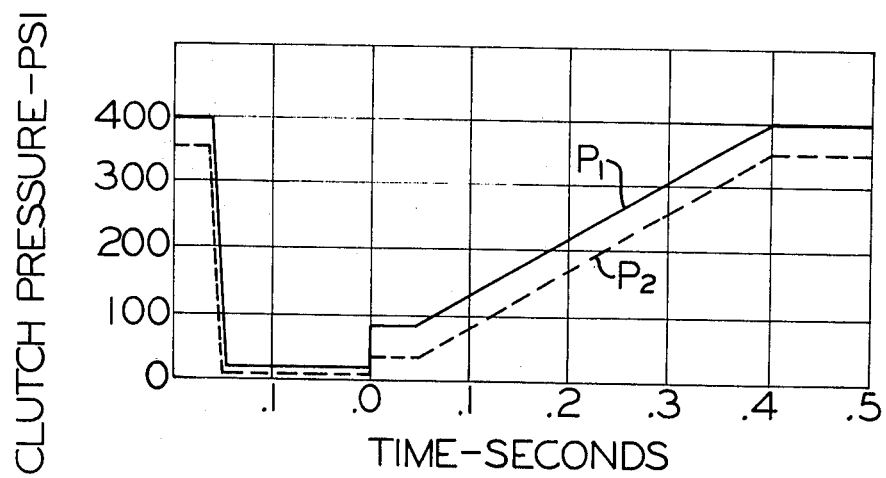
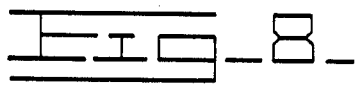
Fig. 8
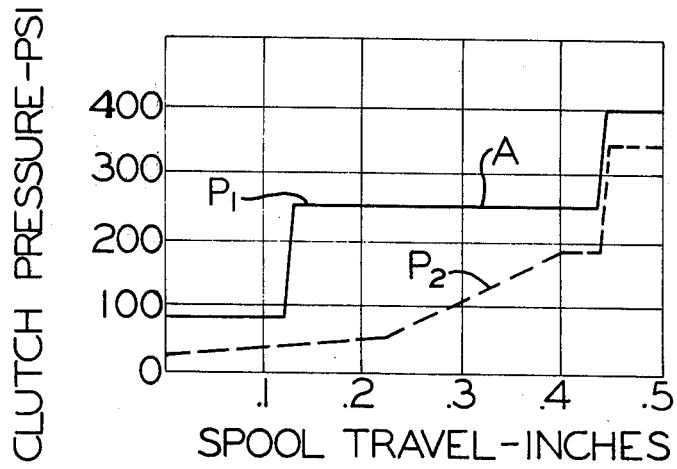

TRANSMISSION CONTROL SYSTEM WITH IMPROVED MODULATING VALVE

BACKGROUND OF THE INVENTION

The present invention relates to improvements within a hydraulic pressure modulating control circuit and more particularly to such a control circuit wherein a modulating valve is manually operable for precisely regulating fluid pressure communicated to a master clutch.

The invention is described herein with particular reference to a transmission of the type including a number of range clutches, speed ratio clutches, and directional clutches which may be selectively engaged to transmit driving force through the transmission. Although the following description refers to friction clutches for establishing a gear train within the transmission, other transmissions of a type contemplated by the present invention may include brakes for establishing a selected gear train. Accordingly, the following description and claims refer to the use of friction clutches and that term is intended to refer to either friction clutches or friction brakes employed to establish a selected gear train within a transmission.

The present invention also particularly contemplates such a transmission having one set of master clutches which are of relatively and durable construction for establishing a selected drive train in the transmission. The master clutches may be engaged sequentially after other clutches within the transmission in order to absorb the shock of transmitting power through the drive train of a vehicle. Preferably, a speed ratio clutch and a range clutch are engaged prior to engagement of a directional clutch within the transmission described below, the directional clutch thus serving as a master clutch.

The present invention contemplates a transmission control circuit employing a differential valve and an associated pressure modulating valve similar to those described in U.S. Pat. No. 3,468,194, which issued on Sept. 23, 1969 and was assigned to the Assignee of the present invention.

However, the differential valve and associated pressure modulating valve, as described below, preferably function in combination with a manual modulating valve, that combination also being set forth within a co-pending application entitled: TRANSMISSION CONTROL SYSTEM WITH DUAL PURPOSE MODULATING VALVE, filed Apr. 27, 1973 as application Ser. No. 355,191, now U.S. Pat. No. 3,882,980, issued May 13, 1975, and assigned to the Assignee of the present invention.

SUMMARY OF THE INVENTION

The present invention contemplates a transmission control circuit of the type referred to above including a differential valve and associated pressure modulating valve for supplying fluid at differentially modulated pressures to master clutches within a transmission drive train and other clutches which are to be sequentially engaged prior to the master clutches. In addition, a manual modulating valve modulates the differential pressure supplied to the master clutches to provide precise regulation of the transmission.

It is to be noted that the manual modulating valve may be used in substantially the same manner even without the particular differential relation described below and referred to above for the two fluid pressures. For example, it would be possible for the two pressures to be substantially equal.

Within the present invention, the manual modulating valve includes means for selectively communicating the pressure modulating valve with a fluid drain in order to assure proper fluid pressure modulation upon subsequent adjustment of the manual modulating valve. The manual modulating valve also preferably includes additional drain means to assist in fluid pressure adjustment or modulation.

Additional objects and advantages of the invention are made apparent in the following description having reference to the accompanying drawings.

BRIEF DESCRIPTION OF THE DRAWINGS

FIG. 7 is a graphical representation of multiple pressure traces developed within the control circuit of FIGS. 1 and 2 to emphasize a first pressure and a second differentially related pressure developed primarily by the differential valve of FIG. 1.

FIG. 8 is a graphical representation of the two pressures also illustrated in FIG. 7 while further emphasizing the function of the manually controlled modulating valve of FIG. 1 with respect to the two differential pressures.

DESCRIPTION OF THE PREFERRED EMBODIMENT

Figure 1:
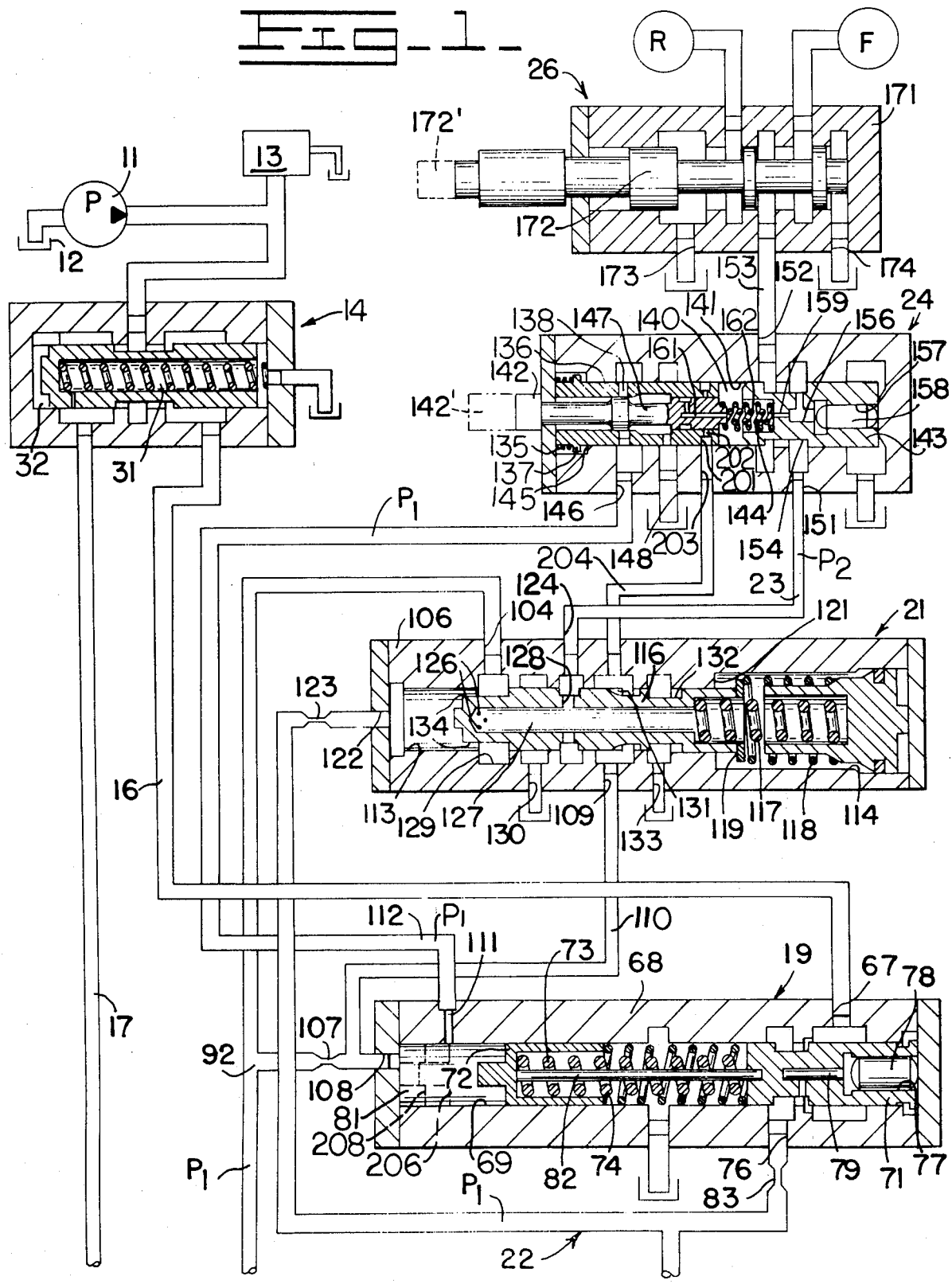
FIG. 1 is a schematic circuit diagram, with parts in section, of a hydraulic transmission control circuit emphasizing a differential valve and associated pressure modulating valve together with a manually controlled modulating valve which includes a particular feature of the present invention.
Figure 2:
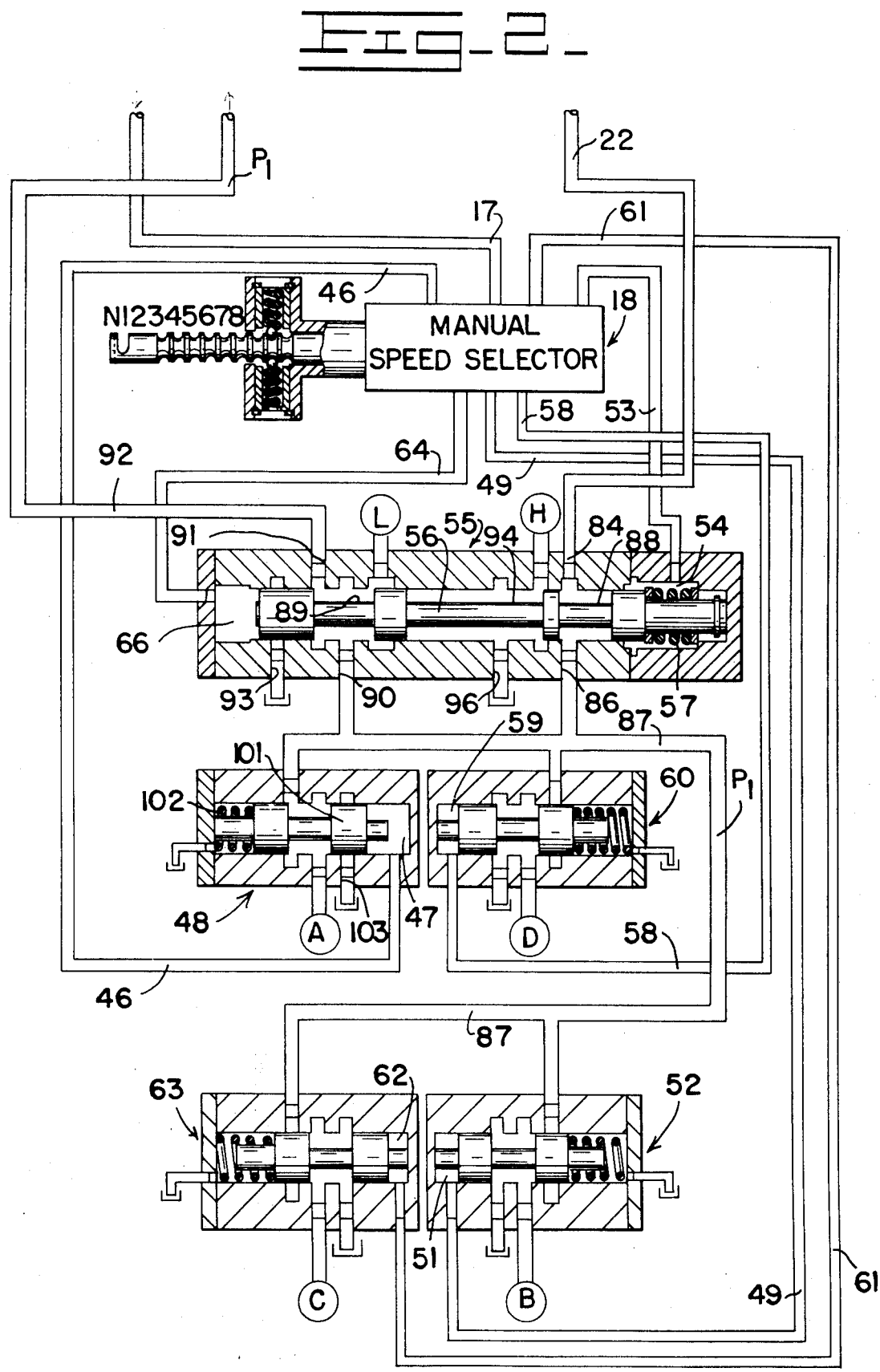
FIG. 2 is a schematic circuit diagram, with parts in section, of an additional portion of the hydraulic transmission control circuit, emphasizing a speed ratio selector portion of the circuit for use in combination with the circuit of FIG. 1.

A hydraulic transmission control circuit, of the type illustrated in FIGS. 1 and 2, actuates a selected combination of friction clutches to establish a drive train through a transmission. Having reference to FIGS. 1 and 2, such a conventional vehicle transmission, which is not otherwise shown, may include a pair of hydraulically actuated directional clutches as indicated at R (reverse) and F (forward). In order to establish a speed ratio within the transmission, additional hydraulically actuated friction clutches as indicated at A, B, C and D function in combination with respective reduction gear sets to establish different speed ratios. Range gear clutches, indicated at L (low range) and H (high range), are also hydraulically actuated so that a selected speed ratio may be established within the transmission by simultaneous actuation of one of the range clutches L and H together with one of the speed ratio clutches A–D. Accordingly, the transmission is operable to provide eight operative speed ratios in either direction through selective engagement of these clutches.

The transmission control circuit is supplied with hydraulic fluid under pressure by a pump or source 11 drawing fluid from a reservoir 12. A pressure relief valve 13 regulates output pressure from the pump 11 to maintain an initial predetermined pressure of, for example 400 psi.

Fluid under pressure from the pump 11 is divided by a priority reducing valve 14 which functions to establish main rail fluid pressure in a conduit 16 while also communicating fluid pressure at a substantially lower pressure to a conduit 17. The lower fluid pressure in conduit 17 is supplied to a speed selector valve 18 (See FIG. 2). The speed selector valve 18 is manually operable in a manner described in greater detail below to selectively actuate one of the range clutches L and H and to simultaneously actuate one of the speed ratio clutches A–D.

Main rail fluid in the conduit 16 is supplied to a modulating valve 19 which operates in association with a differential valve 21 to supply first modulated fluid pressure $P_1$ in a branched conduit 22 and a second pressure $P_2$ in a conduit 23, the pressure $P_2$ being differentially related to the pressure $P_1$ as described in greater detail below. The pressure $P_1$ in conduit 22 is supplied to the speed selector section of the control circuit as illustrated in FIG. 2.

The differential pressure $P_2$, which may be further adjusted by a manual modulating valve 24, is supplied to a directional selector valve 26 which is also manually operable to select one of the directional clutches R or F. The manual modulating valve 24 is also operable in a manner described below to selectively decrease the pressure $P_1$ while it is adjusting the pressure $P_2$ supplied to one of the clutches R or F.

The priority reducing valve 14 includes a spring-loaded spool 31 with fluid from the pump 11 entering a chamber 32, the spring-loaded spool functioning in a pressure-reducing mode to deliver fluid at a reduced pressure of, for example, 84 psi to the conduit 17. The spool 31 simultaneously communicates substantially full pump pressure of, for example, 400 psi to the conduit 16.

Referring now to FIG. 2, the conduit 17 communicates the reduced pressure of 85 psi, which may be considered a pilot pressure, to the speed selector valve 18 shown in greater detail by FIGS. 3–6. Having reference also to those figures, the speed selector valve 18 includes a manifold spool 33 slidably arranged within a bore 34 in a valve body 36. The manifold spool 33 is manually adjustable by means not shown while one end 37 of the spool extends from the bore 34 and forms a plurality of detent grooves. A spring-loaded detent assembly 38 functions in combination with the detent grooves 35 to accurately determine and maintain a selected spool position.

Positions for the spool 33 corresponding to the various possible speed ratios are indicated by the numerals 1–8 and the letter N (Neutral gear).

The interior of the manifold spool 33 is divided by a centrally arranged plug 39 to form a drain cavity 41 and a pressure chamber 42. The drain cavity 41 and pressure chamber 42 are formed as a counterbore within the spool 33. The rightward end of the spool and the pressure chamber 42 are closed by a plug as indicated at 43.

Figure 3:
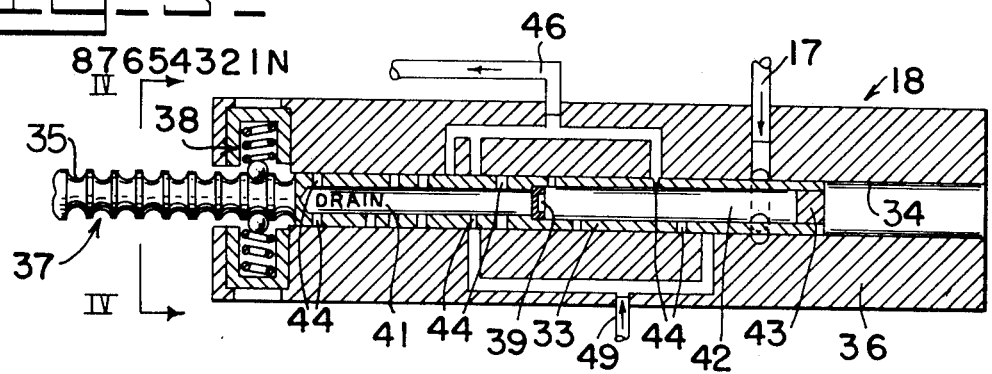
FIG. 3 is a fragmentary sectioned view of a speed selector valve which is illustrated schematically in FIG. 2.
Figure 4:
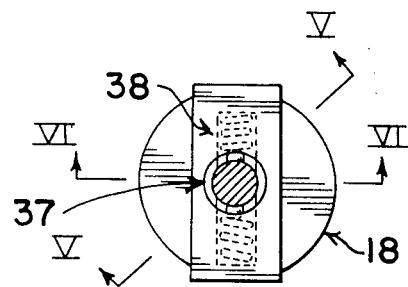
FIG. 4 is a view taken from the left end of the speed selector valve as seen in FIG. 3.
Figure 5:
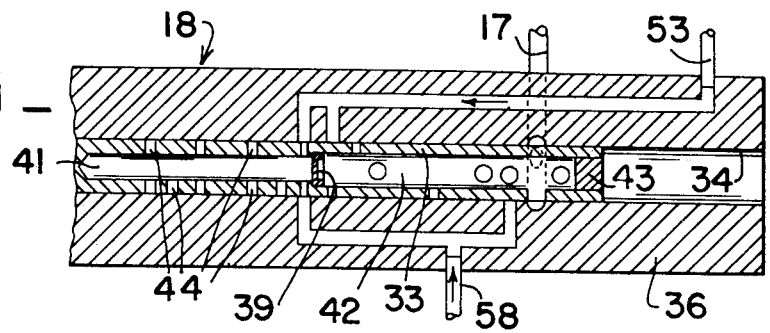
FIGS. 5 and 6 are views taken respectively along section lines V—V and VI—VI of FIG. 4.
Figure 6:
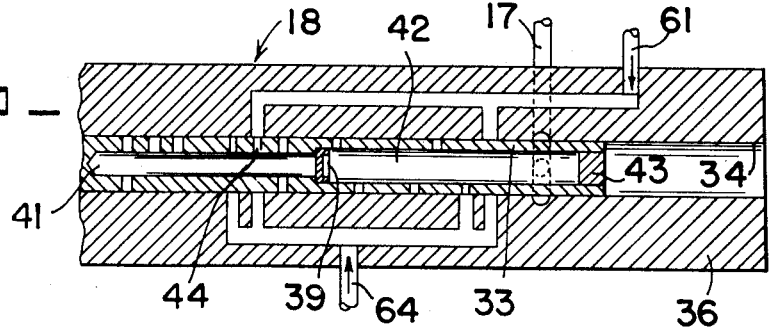

A substantial number of orifices and passages, collectively indicated at 44, are formed in the valve body 36 and the spool 33. The full arrangement of orifices 44 may be seen by combined reference to the various longitudinal planes within the valve as illustrated by FIGS. 3, 5, and 6. The orifices 44 are axially and circumferentially arranged to provide communicating fluid paths in order to selectively pressurize or drain various conduits as described in greater detail below.

As shown in FIGS. 2 and 3, a conduit 46 communicates the speed selector valve 18 with a control chamber 47 in a valve 48 which is operable in a manner described below for actuating clutch A. A second conduit 49 communicates the valve 18 with a controlled chamber 51 in a valve 52 which actuates clutch B. Referring to FIG. 5, a conduit 53 communicates the valve 18 with another control chamber 54 of a three-position range selector valve 55. Within the valve 55, a spool 56 is biased toward a central position by means of a spring 57. Pressurized fluid entering the control chamber 54 through the conduit 53 tends to force the spool 56 in a leftward direction as viewed in FIG. 2 in order to actuate the high range clutch H. An additional conduit 58 communicates the valve 18 with a control chamber 59 of a valve 60 which is operable to actuate the clutch indicated at D.

Referring now to FIG. 6, another conduit 61 communicates the valve 18 with a control chamber 62 in a valve 63 which is operable to actuate the clutch C. Yet another conduit 64 communicates the valve 18 with a control chamber 66 in the opposite end of the range selector valve 55 from the chamber 54 for actuating the low range clutch L. Additional structural and operating features of the speed selector segment of the control circuit, as shown in FIG. 2 are further described below along with cooperating elements of the control circuit as illustrated in FIG. 1.

Referring again to FIG. 1, substantially full pressure from the pump 11 is supplied through the conduit 16 to an inlet passage 67 in the modulating valve 19. The modulating valve 19 has a valve body 68 forming a bore 69 in communication with the inlet passage 67. A modulating reducing valve spool 71 is arranged within the bore 69 adjacent the inlet passage 67. A load piston 72 is also arranged within the bore 69, a pair of springs 73 and 74 being arranged for interaction between the load piston 72 and reducing spool 71 to urge the load piston 72 and spool 71 into opposite ends of the bore 69. An outlet passage 76 is also formed in communication with the bore 69, the reducing spool 71 being movable in the bore 69 to regulate fluid communication from the inlet passage 67 to the outlet passage 76 and accordingly to the branched conduit 22. As will be discussed in greater detail below, the conduit 22 provides communication both to the differential valve 21 and the speed selector valve 18 as shown in FIG. 2.

The rightward end of the reducing spool 71, as viewed in FIG. 1, forms a chamber 77 containing a reaction slug 78. Fluid from the inlet passage 67 is communicated into the chamber 77 by a cross-drilled passage 79 formed in the spool 71 so that the spool 71 acts in a generally conventional fashion as a modulating reducing valve.

An end 81 of the bore 69 adjacent the load piston 72 forms a load piston chamber. Fluid pressure developed in the load piston chamber 81 in a manner described in greater detail below, urges the load piston 72 against the springs 73 and 74 while a tube 82 supported by inner spring 73 limits rightward movement of the load piston 72 relative to the spool 71. Accordingly, the modulating spool 71 and load piston 72 interact through the springs 73 and 74 to modulate fluid pressure communicated through the inlet passage 67 to the outlet passage 76 of the pressure modulating valve 19. In the absence of fluid pressure, the load piston 72 is urged to the left end of the bore 69; however, as fluid pressure develops within the load piston chamber 81, the load piston 72 is urged rightwardly into a position such as that illustrated in FIG. 1.

The rate of pressure modulation for the main rail hydraulic fluid pressure $P_1$ as produced by the hydraulically responsive modulating valve 19 is graphically represented by the solid line trace in FIG. 7.

A restrictive orifice 83 regulates the flow of fluid from the outlet passage 76 into the branched conduit 22 for communication to the range selector valve 55 of FIG. 2. The range selector valve 55 has an inlet passage 84 in communication with the conduit 22 and an outlet passage 86 in communication with another branched conduit 87. An annular groove 88 in the spool 56 provides constant fluid communication between the inlet passage 84 and the outlet passage 86 regardless of the position of the spool 56 within the range selector valve 55. The valve 55 has an additional inlet passage 90 in communication with the branched conduit 87 while another annular groove 89 provides selective communication between the inlet passage 90 and an outlet passage 91. The outlet passage 91 is in communication with still another branched conduit 92 which communicates fluid to both the load piston chamber 81 of the pressure modulating valve 19 and the differential valve 21. The annular groove 89 also provides selective communication from the inlet passage 90 to the low range clutch L and also from the outlet passage 91 to drain passage 93.

When the spool 56 is centrally positioned within the range selector valve 55 by the spring 57, another annular groove 94 communicates the low range clutch L with a drain passage 96. The spool 56 remains in its spring-centered position when the speed selector spool 33 (See FIG. 3) is manually set in any of the high speed ranges 5-8 since neither of the actuating chambers 54 or 66 in the range selector valve 55 is then pressurized. When the speed selector spool 33 is moved to the neutral position indicated at N, fluid from the conduit 17 is communicated to the actuating chamber 54 and the spool 56 is shifted leftwardly so that the outlet passage 91 is communicated with the drain passage 93. When the speed selector spool 33 is shifted to any of its low speed ranges 1-4, actuating fluid from the conduit 17 is communicated to the chamber 66 so that the spool 56 is then shifted rightwardly. This position of the spool 56 is illustrated in FIG. 2 with the high range clutch H being in communication with the drain passage 96 and the inlet passage 90 being in communication with both the low range clutch L and the outlet passage 91.

The branched conduit 87, containing modulated main rail fluid pressure $P_1$, is also in communication with an inlet port in each of the actuating valves 48, 52, 60 and 63. The four actuating valves are of similar construction and the following description for the actuating valve 48 is also applicable to the other valves 52, 60 and 63.

The valve 48 has a spool 101 which tends to be urged rightwardly within the valve 48 as viewed in FIG. 2 by a spring 102. However, the spool 101 is illustrated in a leftwardly shifted position in response to fluid pressure communicated from a speed selector valve 18 by the conduit 46. This condition, of course, corresponds with the position of the speed selector valve spool in its first speed ratio position as is also illustrated in FIG. 2. When the spool 101 is shifted leftwardly, fluid pressure $P_1$ from the conduit 87 is communicated to the speed ratio clutch A. With the speed selector valve in the position shown by FIG. 2, both the speed ratio clutch A and the low range clutch L are thus actuated by pressure $P_1$ from the branched conduit 87.

Accordingly, the range clutches L and H, as well as the speed ratio clutches A-D are respectively actuated by the range selector valve 55 and the various actuating valves 48, 52, 60 and 63.

The conduit 92 communicates the outlet port 91 of the range selector valve 55 with an inlet passage 104 formed by the housing 106 of the differential valve 21. As noted above, the conduit 92 is effective to communicate fluid pressure $P_1$ to the inlet passage 104 except when the speed selector valve 18 is in its neutral position N. With the speed selector valve in its neutral position, the conduit 92 provides a fluid drain for the inlet passage 104 which is important to operation of the differential valve 21 as described in greater detail below.

The conduit 92 also has a restrictive orifice 107 for communicating fluid pressure $P_1$ through an inlet passage 108 to the load piston chamber 81 in the modulating valve 19 and to a second inlet passage 109 in the differential valve 21. The inlet passages 108 and 109 are in substantially unrestricted communication by means of an interconnecting conduit 110. The restrictive orifice 107 reduces the rate of fluid flow into the inlet passages 108 and 109 to assist in establishing desired timing for operation of the modulating valve 19 and differential valve 21 in accordance with an operating description as set forth below.

The housing 68 for the pressure modulating valve 19 also forms a restricted outlet passage 111 which communicates the load piston chamber 81 with a conduit 112 after the load piston 72 is initially shifted toward the right by fluid pressure from the inlet passage 108. The conduit 112 is in communication with the manual modulating valve 24 as is also discussed in greater detail below.

The pressure differential valve 21 provides a regulated flow of hydraulic fluid at the pressure $P_2$, having a differentially constant value compared with the main rail pressure $P_1$, to the directional clutches R and F across the manual modulating valve 24. The differential valve has a bore 113 with a plurality of annular recesses and an enlarged portion 114 at one end thereof. A tubular differential valve spool 116, being closed at one end and having annular grooves along its length, is disposed for longitudinal motion within the bore 113. Two springs 117 and 118 are arranged to exert a differential force upon the valve spool 116. The spring 117 acts directly upon the differential valve spool 116 while the outer spring 118 acts against a washer 119. Leftward motion of the washer 119 is resisted by a shoulder 121 so that the outer spring 118 acts upon the differential valve spool 116 only after it moves rightwardly of the shoulder 121.

The differential valve 21 has an inlet port 122 for receiving fluid at pressure $P_1$ from the branched conduit 22 across a restrictive orifice 123 which has a safety reset delay function. The other inlet port 109 is also in communication with the bore 113 and the branched conduit 92 as described above so that fluid at pressure $P_1$ is communicated into the bore 113, at a restricted rate determined by the size of the orifice 107. The inlet passage 122 provides a first source of hydraulic fluid to act against the differential valve spool 116. As noted above, the inlet passage 104 also communicates fluid at pressure $P_1$ to the bore 113 except when the speed selector valve of FIG. 2 is in its neutral position. The differential valve has an outlet passage 124 for communicating the valve bore 113 with the conduit 23. The differential valve operates to establish the pressure $P_2$ within the conduit 23 as indicated by the broken line trace represented in FIG. 7, the pressure $P_2$ being communicated to the manual modulating valve 24 through the conduit 23.

Multiple ports 126, functioning as a differential fluid pressure regulator, are defined in the differential valve spool 116 to regulate the flow of hydraulic fluid from the inlet passages 122 and 104 to the outlet passage 124 by means of an internal chamber 127 within the differential valve spool and outlet passages 128 formed in the spool 116. The ports 126 permit such flow only when they are in register with an annular recess 129 which communicates the inlet passage 104 with the bore 113.

As is described in greater detail in U.S. Pat. No. 3,468,194, noted above, the differential valve spool is urged rightwardly if the pressure differential between the bore 113 and the internal chamber 127 exceeds a set pressure of, for example, 50 psi. Fluid communication is thereby established from the inlet passages 104 and 122 to a drain passage 130 in order to restore the predetermined pressure differential of 50 psi. The differential valve spool has a plurality of axially formed throttling slots, two of which are indicated at 131. The throttling slots 131 serve to communicate the conduit 23 to a drain passage 130 at a controlled rate when the spool is in its normal neutral position at the left end of the bore 113. The throttling slots control the rate of fluid flow from the directional clutches during speed shifts to reduce the subsequent fill time when the same directional clutch is again engaged. This function is also discussed in greater detail in the above-noted patent. The spool 116 also has an annular groove 132 for communicating the inlet passage 109 with a drain passage 113 when the spool is intermediately positioned to the left of the position illustrated in FIG. 1. This arrangement enables the differential valve to serve as a check valve and insure pressure modulation by the modulating valve 19, until the sequence clutch fill is completed.

Relief flats 134 are formed as flattened surface portions at the end of the differential valve spool 116. The flats 134 eliminate pressure peaks at the end of the fill period for the speed ratio clutches and contribute to a safety function which is briefly described further below.

The manual modulating valve 24 has a bore 141 with a manually operated metering spool 142 and a reducing spool 143 positioned in opposite ends thereof. A spring 144 is arranged for interaction between the manually operated metering spool 142 and the reducing spool 143 and has a tendency to urge them toward their respective ends of the bore 141. The manual modulating valve 24 also has an inlet passage 146 for receiving the restricted flow of main rail hydraulic fluid pressure $P_1$ from the load piston chamber 81 of the modulating valve 19 through the conduit 112. An annular groove 147 defined in the spool 142 provides fluid communication between the inlet passage 146 and a drain passage 148 when the spool 142 is shifted leftwardly, for example, to the position indicated in broken lines at 142'.

With the spool 142 positioned rightwardly as illustrated in FIG. 1, the inlet passage 146 is blocked and the manual modulating valve 24 has substantially no effect upon the control circuit. As the spool 142 is manually shifted leftwardly towards its position indicated at 142', the passage 146 is progressively opened for communication with the drain passage 148. Metered flow of main rail hydraulic fluid from the load piston chamber 81 of the modulating reducing valve 19 permits the load piston 72 to shift leftwardly within the bore 69. This results in modulated reduction of the main rail hydraulic fluid pressure $P_1$, for example, from the full pressure of 400 to 150 psi, as is graphically represented by the solid line trace in FIG. 8.

The manual modulating valve 24 has an inlet passage 151 for communicating the fluid at pressure $P_2$ from the conduit 23 into the bore 141 adjacent the reducing spool 143. An outlet passage 152 communicates the bore 141 with a conduit 153 which delivers fluid pressure to the directional clutches R and F depending upon the operating position of the directional selector valve 26. An annular groove 154 formed by the spool 143 provides regulated communication of hydraulic fluid pressure $P_2$ between the inlet passage 151 and the outlet passage 152 without restriction when the spool 143 is positioned to the right as illustrated in FIG. 1. An internal passage 156 communicates the annular groove 154 with a chamber 157 formed by the spool 143 to receive a reaction slug 158. A small restricted passage 159 communicates the chamber 157 with the bore 141 to the left of the modulating spool. An internal, cross-drilled passage 161 formed in the metering spool 142 thus serves to communicate the passage 159 and chamber 157 with the drain passage 148 when the metering spool is shifted to the left.

As the spool 142 is moved progressively to the left, the reducing spool 143 also tends to be shifted leftwardly by fluid pressure $P_2$ acting against the reaction slug 158. Accordingly, the inlet passage 151 is progressively restricted from communication with the outlet passage 152 in order to control or regulate the flow of hydraulic fluid at differential pressure $P_2$ to the directional selector valve 26.

The manual modulating valve 24 also includes a slideable sleeve 136 arranged within the bore 141 and surrounding the spool 142. The sleeve 136 acts as a hydraulic overcenter device to improve response of the modulating valve 19.

The sleeve 136 is normally shifted completely to the left against a spring 135 by fluid pressure in a chamber 140 formed between the metering spool 142 and reducing spool 143. When the spool 142 is shifted leftwardly from its solid line position in FIG. 1, the chamber 140 is placed in communication with the drain 148 by the passage 161. As fluid is thus vented from the chamber 140, the sleeve 136 is shifted rightwardly by its spring 135 until a flange 137 contacts a shoulder 145. Ports 138 in the sleeve 136 are then aligned with the inlet passage 146 to permit rapid venting of fluid pressure from the piston chamber 81 in the modulating valve 19.

As the spool 142 is again shifted rightwardly, the passage 161 is blocked and the chamber 140 is again pressurized, causing the sleeve 136 to again shift leftwardly to the position shown in FIG. 1. The inlet passage 146 is thus closed more rapidly to commence increased pressurization of the piston chamber 81 in the valve 19.

The directional control valve 26 includes a simple valve body 171 and a movable spool 172. With the spool 172 positioned to the right, as illustrated in FIG. 1, the conduit 153 is placed in communication with the forward directional clutch F. With the spool 172 shifted to the left into a position illustrated in broken lines at 172', the conduit 153 is placed in communication with the reverse directional clutch R. When the conduit 153 is in communication with the clutch F, the other directional clutch R is in communication with a fluid drain 173. When the spool 172 is shifted to communicate the conduit 153 with the reverse directional clutch R, the forward directional clutch F, is then in communication with another fluid drain 174.

A dual modulating rate within the manual modulating valve 24 is accomplished by the spring 144 and a second spring 162. The second spring 162 is also arranged for interaction between the modulating spool 143 and the metering spool 142. However, the outer spring 162 is sized to reach full extension after initial limited movement of the metering spool 142 to the left. For example, the dual modulating rate established by the two springs 144 and 162 is illustrated by the broken line trace of FIG. 8. Referring also to FIG. 8, it may be seen that approximately 0.1 inch of travel for the metering spool 142 is required to open the drain passage 161.

The pressure $P_2$ is further reduced at a selected rate determined by action of both of the springs 144 and 162 until the metering spool is shifted approximately 0.33 inches to the left. At that point, the outer spring 162 is fully extended so that only the inner spring 144 is interacting between the metering spool 142 and the modulating spool 143. Accordingly, as the metering spool 142 is shifted further to the left from that point, the pressure $P_2$ is modulated at a substantially reduced rate determined only by the spring 144 as illustrated in FIG. 8.

The dual modulation rate described above is particularly suited to provide for accurate control over movement of a vehicle in different operating conditions, for example, in a first condition with the vehicle loaded and in a second condition with the vehicle unloaded. Referring again to FIG. 8, it may be seen that for initial travel at a relatively rapid rate from 0.1 to 0.33 inches of the spool 142, pressure $P_2$ is modulated from approximately 100 to 25 psi, as suitable for gradually moving or "inching" a loaded vehicle. Further movement of the spool 142 to the left results in modulation at the reduced rate as discussed above, for example, from 25 to 3 psi, as is particularly suitable to gradually move or "inch" an unloaded vehicle. Thus, if the vehicle is required to work in close quarters, accurate control over vehicle motion is available for both loaded and unloaded operating conditions.

To further clarify and illustrate operation of the control system, the following operational description is divided into the following three separate operating modes:

1. Starting the vehicle engine with the transmission control inadvertently positioned in gear.
2. Reconditioning the control circuit for a shift from neutral into first gear forward, for example.
3. Adjusting the manually operable modulation valve to regulate the actuating pressure $P_2$ supplied to the directional valves.

STARTING THE VEHICLE ENGINE CONTROL WITH THE TRANSMISSION CONTROL INADVERTENTLY POSITIONED IN GEAR

For this operating mode, assume that the speed selector valve 18 is positioned for first gear operation as shown in FIG. 2. The speed clutch A and the range clutch L are both engaged since actuating fluid is communicated to the control chambers 47 and 66 in the actuating valve 48 and the range selector valve 55 respectively. However, the design of the differential valve 21 in combination with the range selector valve prevents actuation of either of the directional gears R and F, which are intended to act as master clutches as noted above. When the range selector valve 55 is in the first gear position as illustrated in FIG. 2, pressure $P_1$ is in communication with the conduit 92 and accordingly with the inlet passage 104 of the differential valve. Because of the safety reset delay orifice 123, fluid pressure $P_1$ enters the differential valve through the inlet passage 104 before substantial pressure is developed at the left end of the bore 113 from fluid entering into the inlet passage 122. Fluid from the inlet passage 104 is communicated to the differential spool chamber 127 through the passages 128. Pressure thus developed within the chamber 127 cooperates with the springs 117 and 118 to maintain the differential valve spool 116 in a leftward position so that it is not influenced by pressure subsequently entering into the inlet passage 122.

When the range selector valve 55 is subsequently shifted to neutral, the conduit 92 is placed in communication with the drain passage 93. Accordingly, the inlet passage 104 in the differential valve acts as a drain so that rightward movement of the differential valve spool 116 is resisted only by the springs 117 and 118. Under these conditions, fluid pressure entering the inlet passage 122 shifts the differential valve spool rightwardly only enough so that fluid from the inlet passage 122 crosses the relief flats 134 and is communicated to drain through the passage 104 and the conduit 92. With the speed selector valve 18 thus placed in its neutral position, the differential valve 21 is properly conditioned to commence its function of establishing a differential pressure in conduit 23 when the speed selector valve 18 is again shifted, for example, to the first speed setting with the directional selector valve 26 continuing to be set for actuation of the forward clutch F.

RECONDITIONING THE CONTROL CIRCUIT FOR A SHIFT FROM NEUTRAL INTO FIRST GEAR FORWARD

The first gear forward operating mode is illustrated for the various components of the circuit in FIGS. 1 and 2. As the speed selector valve is adjusted to its first gear setting, fluid from the conduit 17 enters the actuating chamber 47 of the valve 48 and the chamber 66 of the range selector valve 55. Accordingly, the speed ratio clutch A and the range clutch L are actuated by pressure $P_1$. As shown in FIG. 7, the hydraulic pressure $P_1$ drops almost to zero for approximately 0.15 seconds as the speed and range clutch are filling and then increases to a slightly higher pressure for approximately 0.05 seconds as one of the directional clutches is filled.

With the range selector valve spool 56 shifted rightwardly, fluid pressure $P_1$ is again communicated through conduit 92 into the differential valve through inlet passage 104. Accordingly, fluid from the inlet passage 122 can no longer escape through the passage 104 and the differential valve spool 116 is shifted rightwardly to the position shown in FIG. 1 so that fluid from both the inlet passages 122 and 104 enters the internal chamber 127 of the differential valve spool through the ports 126. The differential pressure $P_2$ established within the internal chamber 127 is then communicated to the conduit 23 through the passages 128. The fluid pressure $P_2$ is communicated across the manual modulating valve 24 and through the directional selector valve 26 to the forward clutch F.

ADJUSTING THE MANUALLY OPERABLE MODULATION VALVE TO REGULATE THE ACTUATING PRESSURE $P_2$ SUPPLIED TO THE DIRECTIONAL VALVES

With the clutches thus engaged, an operator of a vehicle (not shown) may then condition the pressure $P_2$ in a dual mode of modulation as described above through manual control of the modulating valve 24.

During manual modulation of the pressure $P_2$ by the spool 143, pressure $P_1$ entering the manual control valve 24 through the inlet passage 146 is communicated to the drain 148 so that the modulated pressure $P_1$ as established by the modulating valve 19 is reduced in the manner described above and shown in FIG. 8.

OPERATION OF THE MANUAL MODULATING VALVE TO SELECTIVELY COMMUNICATE THE HYDRAULIC RESPONSIVE MODULATING VALVE TO A DRAIN IN ORDER TO ASSURE PROPER SUBSEQUENT PRESSURE MODULATION

The manual modulating valve 24 accomplishes this function by means of an annular groove 201 and connected passages 202 formed at the right end of the sleeve 136. With the sleeve 136 being positioned completely to the left within the bore 141, the annular groove 201 is in communication with a port 203, the port 203 being in unrestricted communication with the load piston chamber 81 for the hydraulically responsive modulating valve 19. For this purpose, a conduit 204 is in communication with the port 203 and a portion of the differential valve 21 which is also in communication with the conduit 110. As described above, the conduit 110 provides the necessary communication with the load piston chamber 81.

Before proceeding further with the description of this function for the manual modulation valve 24, it is noted with reference also to FIG. 8 that the restricted port 111 within the hydraulically responsive modulating valve 19 is sized to assist in establishing the rate of modulation for the pressures $P_1$ and $P_2$. For example, with the manual modulating spool being moved rightwardly from its position 142′, a modulated pressure rise is accomplished for both of the pressures $P_1$ and $P_2$ as indicated in FIG. 8. The restricted port 111 is sized to establish the level portion indicated at A for the pressure trace of the first pressure $P_1$ until the manual modulating spool is moved almost to its rightward position indicated in solid lines at 142. At that time, the spool 142 commences to close off the conduit 112 from the drain 148 thus serving to cause a rapid rise in the first pressure $P_1$ and accordingly in the second pressure $P_2$.

Referring now particularly to FIG. 1, the position for the load piston 72 within the hydraulically responsive modulating valve 19 may be correlated with the various steady state pressures for the first pressure $P_1$ in FIG. 8. The solid line position of the load piston 72 corresponds with the maximum pressure of 400 psi for the pressure $P_1$. An intermediate position 206 is also illustrated where the load piston is metering fluid flow into the restricted port 111. This position of the load piston corresponds with the level portion A for the pressure trace of the first pressure $P_1$. The initial low pressure of approximately 80 psi for the first pressure $P_1$ corresponds to the load piston being fully shifted to the left as is also indicated by broken lines at 208.

It has been found that shock loading may develop within the control circuit, for example, where the manual modulating spool 142 is rapidly moved to the left toward its position 142′ and then shifted rightwardly again before stabilization of the pressures $P_1$ and $P_2$. For example, because of the sizing of the restrictive port 111 as described above, rapid shifting to the left of the spool 142 may not permit sufficient fluid to pass from the load piston chamber 81 to the drain 148 in order to permit the load piston 72 to shift completely to its leftward position indicated at 208.

Accordingly, that function is accomplished by the drain passages 201 and 202 in combination with the intercommunicating conduits 204 and 110. Without the unrestricted drain communication provided by those passages and conduits, the load piston might have time only to return toward approximately its mid-position illustrated at 206 during rapid shifting of the spool 142. Upon subsequent shifting of the manual modulating spool 142 to the right, the first pressure $P_1$ would be increased and the second pressure $P_2$ would accordingly be caused to rise very rapidly resulting in an excessively rapid rate of engagement for one of the directional clutches R or F.

However, with unrestricted communication to drain provided by the passages 201 and 202, the port 203 and the conduits 204 and 110, the load piston 72 is permitted to return completely to the left whenever the manual modulating spool 142 is shifted toward its leftward position indicated at 142′. At the same time, the pressure $P_2$ is also communicated to the drain 148 through the passage 161 as described above. Accordingly, the unrestricted communication between the manual modulating valve 24 and the hydraulically responsive modulating valve 19 serves to assure proper modulation for both of the pressures $P_1$ and $P_2$.

I claim:
1. A hydraulic transmission control circuit for selectively actuating at least one of a plurality of speed ratio clutches with hydraulic fluid at a first pressure and for selectively actuating one of a plurality of directional clutches at a second differential pressure, comprising
a fluid source,
a speed ratio selector valve for communicating fluid at the first pressure to one of the speed ratio clutches,
a directional selector valve for communicating fluid at the second differential pressure to one of the directional clutches,
a differential valve in communication with the fluid source, the differential valve including means for communicating hydraulic fluid at the second differential pressure to the directional selector valve,
a first hydraulically responsive pressure modulating valve in communication with the source and the differential valve for modulating hydraulic fluid at the first pressure, and a manually controlled modulating valve for communicating fluid at the second differential pressure from the differential valve to the directional selector valve, the manually controlled modulating valve including means for selectively modulating the second differential pressure into discrete operating modes in order to provide precise regulation of clutch engagement under different operating conditions, said two discrete operating modes being characterized by the selective modulating means in the manual modulating valve being operable to vary the second differential pressure at two different rates of modulation in order to selectively regulate the degree of engagement in the directional clutches, the manually controlled modulating valve also including first relief means in communication with the first pressure modulating valve to selectively adjust the first fluid pressure during selective modulation of the second differential pressure by the manually controlled modulating valve, the manually controlled modulating valve also including second relief means also in communication with the first pressure modulating valve for selectively providing relatively unrestricted communication between the first pressure modulating valve and a fluid drain in order to condition the first pressure modulating valve for establishing the first fluid pressure at a minimum level in order to facilitate subsequent modulation of both the first and second fluid pressures.

2. The hydraulic control transmission circuit of claim 1 wherein the relief means is effective to provide relatively restricted communication between the first modulating means and a fluid drain in order to maintain the first fluid pressure at a selected level during regulating operation of the manually controlled modulating valve.

3. The hydraulic transmission control circuit of claim 1 wherein the first pressure modulating valve includes a valve body defining a bore, a hydraulically responsive load piston being arranged within the bore to form a load piston chamber, the load piston chamber being in communication with the first relief means by means of relatively restricted passage, the load piston chamber also being in communication with the second relief means by means of a relatively unrestricted passage.

4. A hydraulic transmission control circuit for selectively actuating a master clutch with hydraulic pressure and for selectively actuating one or more additional clutches with hydraulic fluid pressure, comprising a fluid source, a first selector valve means for communicating fluid to the master clutch, a second selector valve for communicating fluid to one of the additional clutches, first pressure modulating valve means in communication with the source, the first selector valve means and the second selector valve means, and a manually controlled modulating valve arranged for communication with the first pressure modulating valve means and the first selector valve means, the manually controlled modulating valve including means for selectively modulating fluid pressure communicated to the first selector valve in two discrete operating modes in order to provide more precise regulation over master clutch engagement under different operating conditions, the selective modulating means being operable to adjust the fluid pressure communicated to the first selector valve at two different rates of modulation for providing the two discrete operating modes, the selective modulating means in the manual modulating valve comprising a modulating valve spool, a manually adjustable element and first and second resilient means arranged for operative interaction between the modulating valve spool and the manually adjustable element, the first and second resilient means having different spring characteristics in order to vary the pressure communicated to the first selector valve at two distinctly different rates of modulation under control of the manually adjustable element, the manual modulating valve also including relief means for selectively communicating the first pressure modulating valve means with a fluid drain in order to condition the first pressure modulating valve means for establishing fluid pressure at a minimum level.

5. The hydraulic transmission control circuit of claim 4 wherein the first pressure modulating valve means includes a valve body forming a bore, a hydraulic responsive load piston being arranged within the bore to form a load piston chamber, the load piston chamber being in relatively unrestricted communication with the relief means in the manual modulating valve.

6. The hydraulic transmission control circuit of claim 5 wherein the manual modulating valve further comprises an additional relief means for providing relatively restricted communication between the first pressure modulating valve means and a fluid drain in order to selectively adjust fluid pressure established by the first pressure modulating valve means in response to movement of its manually adjustable element.

* * * * *